United States Patent Office 2,799,664
Patented July 16, 1957

2,799,664

IMPROVEMENTS IN THE PRODUCTION OF HIGH LINEAR POLYESTERS

James Gordon Napier Drewitt, Spondon, near Derby, and James Lincoln, London, England, assignors to British Celanese Limited, a corporation of Great Britain No Drawing. Application March 15, 1955,
Serial No. 494,574

Claims priority, application Great Britain April 2, 1954

19 Claims. (Cl. 260—45.4)

This invention relates to improvements in the production of polymeric compounds and more particularly linear polyesters.

According to United States application Serial No. 302,822, filed August 5, 1952, linear polyesters are produced by condensing a free dicarboxylic acid with a cyclic glycol carbonate, for example cyclic ethylene carbonate, cyclic trimethylene carbonate and the cyclic carbonate of propylene glycol. While the invention of that specification may be applied to the production of linear polyesters from glycols and aliphatic dicarboxylic acids such as adipic acid, suberic acid and sebacic acid, or aromatic aliphatic acids such as para-phenylene diacetic acid, its principal advantages are obtained in the production of high melting polyesters using aromatic dicarboxylic acids which are refractory in the sense that they are high melting and difficult to dissolve, and in particular terephthalic acid. By using a cyclic glycol carbonate a smoother reaction is achieved since the reaction mixture becomes homogeneous more readily than is the case when the free dicarboxylic acid is reacted with the free glycol.

According to the present invention, a linear polyester is prepared by adding a free dicarboxylic acid and a cyclic glycol carbonate to a pre-formed polymer and heating until a homogeneous melt is formed.

In practice we find it convenient to add the free dicarboxylic acid and the cyclic glycol carbonate to an already-formed low polymer, preferably of the same constituents; that is to say, if terephthalic acid and ethylene carbonate are to be condensed, these two reagents are preferably added to a low polymer produced from terephthalic acid and cyclic ethylene carbonate or of course from dimethyl terephthalate and ethylene glycol. This is the most important application of the invention, which will be more particularly described with respect to this embodiment, although the invention covers the manufacture of a linear polyester by adding free dicarboxylic acid and cyclic glycol carbonate to any pre-formed polymer.

By using the process of the present invention a clear homogeneous melt can be obtained in an even shorter time than is the case when using the process described in United States application Serial No. 302,822, and again the reaction is very smooth. It should be borne in mind that the proportions of monomeric reagents added, relative to the amount of low polymer present, affect the facility with which the process may be carried out. Preferably, about equal quantities of monomeric reagents and low polymer are mixed together. A lower ratio of low polymer to monomeric reagents may be used, e. g. down to 1:2, but if the ratio is less than 1:2, the mixture becomes homogeneous much less readily. Similarly, a higher ratio of low polymer:monomeric reagents may be used, e. g. up to 4:1.

In carrying out the process of the invention, a small quantity of monomeric reagents may be mixed with an approximately equal quantity of low polymer. After heating the mixture to form a clear homogeneous melt, a further quantity of monomeric reagents roughly equal to the total quantity of low polymer present may be added. The process may then be repeated, some of the low polymer being withdrawn if desired.

It is convenient to carry out the whole process in three stages, in the first of which the monomeric materials may be fed to the pre-formed low polymer and the process may be carried out at atmospheric pressure under reflux, in the second of which heating may be continued at atmospheric pressure or under a low vacuum, and in the last of which reaction may be continued under a high vacuum, for example an absolute pressure of 2–10 mms. of mercury. In the first stage, in which the polyesterification may be carried to the low polymer stage under reflux, some of this low polymer may be removed and further condensed to the desired high polymer while the rest may be used as the medium for esterification between a further quantity of free dicarboxylic acid and cyclic glycol carbonate. By this process continuity of operation, at least to the low polymer stage, is comparatively readily achieved. Thus, the monomeric reagents may be added slowly to a relatively large mass of molten low polymer maintained at the appropriate temperature and under reflux, the reaction mixture being continuously stirred to form a homogeneous melt, part of which is drawn off at an equivalent rate to that at which the monomeric reagents are added. Alternatively, the monomeric reagents may be fed to a tower maintained at the appropriate temperature and under reflux, the reaction mixture being drawn off at the bottom; in this case, if desired, part of the reaction mixture can be returned to the top of the tower and part transferred to the polymeriser for the next stage.

Even when working the first stage as a continuous process, it is usually simpler to carry out the second and third stages of the polymerisation as batch operations. If desired the output of several reactors in which the first step is carried out may be blended before being fed to one or more polymerisation vessels, in which the second and third stages are carried out. It is preferred to use a few relatively large continuously operating pre-polymerising vessels, a blending tank and several relatively small batch autoclaves. The pre-polymerising vessels feed the molten, low-molecular weight polymer to the blending tank which feeds to each in turn of the batch autoclaves, where the second and third stages are carried out.

The low polymer into which the monomeric reagents are fed according to the present invention may have an intrinsic viscosity of the order of 0.1–0.4 and preferably 0.15–0.3. In this specification the term "intrinsic viscosity" means the value of $\log_e (\eta_r/c)$, where $\eta_r$ is the relative viscosity of a solution of $c$ grams of the polymer in 100 ccs. of meta-cresol, $c$ being of the order of 1 gram. It is convenient to use a low polymer having an intrinsic viscosity of the order of 0.25 since at this stage the polymer is still fairly fluid and therefore can be readily mixed with the incoming monomeric reagents and at the same time condensation is quite well advanced.

During the condensation and in any of the other stages stirring may be resorted to and indeed is of advantage since generally these reaction mixtures are of relatively low thermal conductivity.

The invention may be applied to the production of polymers from the glycols and dicarboxylic acids mentioned in United States application Ser. No. 302,822. As in the above-mentioned specification aliphatic or aromatic aliphatic dicarboxylic acids may be used, but the invention is most advantageous in making high-melting polyesters from glycols and high-melting aromatic dicarboxylic acids. Such aromatic acids include terephthalic acid and certain substituted terephthalic acids, diphenyl-4,4'-dicarboxylic acid, α.β diphenylethane-4.4'-dicarboxylic acid, α.δ-diphenylbutane-4.4'-dicarboxylic acid and other α.ω-diphenylalkane-4.4'-dicarboxylic acid, α.β-diphenoxyethane-4.4'-dicarboxylic acid, α.δ - diphenoxybutane - 4.4' - dicarboxylic acid and other α.ω - diphenoxyalkane - 4.4' - dicarboxylic acids, and the 1.5-, 2.6- and 2.7-naphthalene-dicarboxylic acids. All these dicarboxylic acids have their carboxy groups linked to the aromatic nucleus or nuclei in such a way that (taking the shortest path through the carbon atoms of the nucleus) there are at least four nuclear carbon atoms in each nucleus between the linkages. In this definition a single benzene ring or a single naphthalene ring counts as one aromatic nucleus, while diphenyl

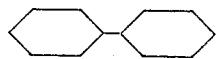

and diphenyl alkane

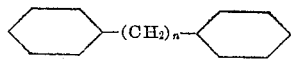

count as two aromatic nuclei. The preferred dicarboxylic acids are those whose carboxy groups are linked to the aromatic nuclei in diametrically opposite positions, that is to say in the para position with a single benzene nucleus, in the 4.4'-position with compounds containing two benzene nuclei, and in the 1.5 or 2.6 positions with compounds of the naphthalene series.

The proportion in which the cyclic glycol carbonate is employed has an important bearing upon the nature and the constitution of the product. For example, when cyclic ethylene carbonate is heated with terephthalic acid in a molar ratio of between 1.0 and 1.3 moles of cyclic carbonate to 1 mole of terephthalic acid, a product is produced having a melting point and other properties very close to those of the polyester produced directly from ethylene glycol and dimethyl terephthalate. If, however, the cyclic glycol carbonate is used in a higher proportion, for example 2 moles of cyclic carbonate to 1 mole of terephthalic acid, the product, while still crystalline, fibre-forming and capable of being cold drawn, has a lower melting point. For some purposes and with some reagents this is an advantage. Thus, for instance the polymer from diphenyl-4.4'-dicarboxylic acid and ethylene glycol melts at a temperature rather too high for ease of melt spinning. In such a case it is possible according to the present invention, to use the cyclic glycol carbonate in excess so as to achieve a lower melting point.

A polyester from a dicarboxylic acid and two or more different glycols may be produced according to the present invention by using the free dicarboxylic acid and a mixture of the cyclic carbonates of the two glycols. This production of mixed polyesters constitutes another method by which polymers melting in the range suitable for melt spinning operations, e. g. 230 or 240–280° C., may be produced using dicarboxylic acids such as diphenyl-4.4'-dicarboxylic acid, which with a single glycol such as ethylene glycol normally produce polymers which are too high melting.

The reaction may be carried out in the presence of an ester-interchange catalyst, for example, magnesium, sodium, sodium and magnesium or lithium or alkoxides thereof. Such a catalyst may be added at the beginning of the reaction or may be added at the point when the reaction mixture becomes homogeneous. If there is any tendency to charring in the early stages while the dicarboxylic acid is in the solid state, it is advisable to carry out this stage of the reaction before the reaction mixture becomes homogeneous at a relatively low temperature, for example around 200° C., until the solid is all dissolved. Generally the temperatures for the polyesterification are of the order of 250–300° C.

The following examples illustrate the invention but do not limit it in any way. In all cases the quantities used are by weight.

*Example 1*

A low polymer was formed from terephthalic acid and cyclic ethylene carbonate using the process of United States application Ser. No. 302,822. This lower polymer had an intrinsic viscosity of 0.26.

20 parts of this low polymer, 16.6 parts of terephthalic acid containing a trace of sodium terephthalate, e. g. about 0.1%, and 10.6 parts of cyclic ethylene carbonate with a small quantity of magnesium ribbon were heated in a stream of nitrogen at 270° C. A clear melt was obtained in about 50 minutes. At this stage a further addition of 33.2 parts of the terephthalic acid and 21.2 parts of cyclic ethylene carbonate was made, and later a still further addition of 66.4 parts of the terephthalic acid and 42.4 parts of cyclic ethylene carbonate. After each addition the reaction mixture took about the same time to form a clear melt. This process was continued and before each addition of new monomer a corresponding quantity of low polymer, intrinsic viscosity about 0.25, was removed.

The low polymer obtained was further polymerised by heating for 2 hours at 270° C. and at atmospheric pressure and then for a further 2 hours at 270° C. under an absolute pressure of 3 mms. of mercury. The resulting polymer was white, tough and had a melting point of 250° C. and an intrinsic viscosity of 0.49. Fibres having good cold-drawing properties could be spun from the melt.

*Example 2*

40 parts of the same low polymer as that used in Example 1, intrinsic viscosity 0.26, were used together with 16.6 parts of terephthalic acid containing a trace of sodium terephthalate, e. g. about 0.1%, 10.6 parts of cyclic ethylene carbonate and a small quantity of magnesium ribbon. The mixture was heated in a stream of nitrogen at 270° C. and formed a homogeneous melt after about 35 minutes. The terephthalic acid and cyclic ethylene carbonate were then added continuously in constant proportions, at the rate of 42.7 parts of the terephthalic acid and 27.1 parts of cyclic ethylene carbonate per hour, while 49.4 parts per hour of low polymer of intrinsic viscosity 0.26 were continuously withdrawn. The polymer was worked up to give a fibre-forming product using the procedure described in Example 1.

The result of even a small-scale comparative trial indicates the considerable saving in time which can be achieved by using the present invention. Thus, two vessels each containing 3.32 parts of terephthalic acid (containing about 0.1% of sodium terephthalate), 2.11 parts of cyclic ethylene carbonate and a small quantity of magnesium ribbon, but one also containing 5 parts of the low polymer from Example 1 were heated in the same oil bath at 270° C. The mixture containing the low polymer formed a clear melt after 45 minutes, but the blank did not form a clear melt until heating had been continued for a further 45 minutes. The results of large-scale trials are even more striking.

Having described our invention what we desire to secure by Letters Patent is:

1. Process for the manufacture of a high linear polyester, which comprises mixing (a) a free dicarboxylic acid and (b) a cyclic alkylene glycol carbonate with (c) a molten low linear polyester, of intrinsic viscosity 0.1–0.4, of a glycol and a dicarboxylic acid, the proportion of said low polyester (c) being sufficient to effect a shortening of the time of the polyester-forming reaction of said acid (a) and said carbonate (b) and being at least ½ the combined weight of (a) and (b), heating the resulting mixture until a reaction product of intrinsic viscosity 0.1 to 0.4 has been formed, and further heating said reaction product until it is fibre-forming.

2. Process as set forth in claim 1 in which the molten polyester (c) is a polyester of said dicarboxylic acid (a) and the alkylene glycol of said carbonate (b).

3. Process according to claim 1 wherein the dicarboxylic acid (a) is an aromatic dicarboxylic acid with its carboxyl groups linked to aromatic carbon atoms in diametrically opposite nuclear positions.

4. Process as set forth in claim 1 wherein the dicarboxylic acid (a) is terephthalic acid and the carbonate (b) is ethylene glycol carbonate.

5. Process according to claim 1 wherein the molar ratio of said carbonate (b) to said dicarboxylic acid (a) is between 1:1 and 2:1.

6. Process according to claim 1 wherein said resulting mixture contains an ester-interchange catalyst.

7. Process as set forth in claim 1 and which the weight of said low polyester (c) mixed with said acid (a) and said carbonate (b) is at most four times the combined weight of (a) and (b).

8. Process for the manufacture of a high linear polyester, which comprises mixing (a) a free dicarboxylic acid and (b) a cyclic alkylene glycol carbonate with (c) a molten low linear polyester, of intrinsic viscosity 0.15–0.3, of a glycol and a dicarboxylic acid, the proportion of said low polyester (c) being sufficient to effect a shortening of the time of the polyester-forming reaction of said acid (a) and said carbonate (b) and being at least ½ the combined weight of (a) and (b), and the amount of said carbonate (b) being at least equivalent to that of said acid (a), heating the resulting mixture until a reaction product of intrinsic viscosity 0.15 to 0.3 has been formed, and further heating said reaction product until it is fibre-forming.

9. Process as set forth in claim 8 in which the molten polyester (c) is a polyester of said dicarboxylic acid (a) and the alkylene glycol of said carbonate (b).

10. Process as set forth in claim 9 wherein the dicarboxylic acid (a) is terephthalic acid and the carbonate (b) is ethylene glycol carbonate.

11. Process for the manufacture of a high linear polyester, which comprises mixing (a) a free dicarboxylic acid and (b) a cyclic alkylene glycol carbonate with (c) a molten low linear polyester, of intrinsic viscosity 0.1–0.4, of a glycol and a dicarboxylic acid, the proportion of said low polyester (c) being sufficient to effect a shortening of the time of the polyester-forming reaction of said acid (a) and said carbonate (b) and being at least ½ the combined weight of (a) and (b), heating the resulting mixture until a molten reaction product of intrinsic viscosity 0.1 to 0.4 has been formed, withdrawing part of said molten reaction product, adding further free dicarboxylic acid (a) in amount equivalent to the amount of said reaction product withdrawn and further cyclic carbonate (b) in amount at least equivalent to the further dicarboxylic acid (a), continuing to heat the mixture, repeating the withdrawal of the molten reaction product and the addition of free dicarboxylic acid (a) and cyclic carbonate (b) in the specified proportions, and further heating the withdrawn reaction product until it is fibre-forming.

12. Process according to claim 11 wherein the dicarboxylic acid (a) is an aromatic dicarboxylic acid with its carboxyl groups linked to aromatic carbon atoms in diametrically opposite nuclear positions.

13. Process as set forth in claim 11 and in which the weight of said low polyester (c) mixed with said acid (a) and said carbonate (b) is at most four times the combined weight of (a) and (b).

14. Process according to claim 11 wherein the reaction of said acid (a), carbonate (b), and low polyester (c) is carried out as a continuous operation, and the further heating of the low polyester reaction product so obtained, to produce a fibre-forming material, is carried out as a batch process.

15. Process according to claim 14 wherein said further heating is carried out in two stages, in the second of which the polyester reaction product is heated under an absolute pressure of 2–10 mm.

16. Process for the manufacture of a high linear polyester, which comprises mixing (a) a free terephthalic acid and (b) cyclic ethylene glycol carbonate with (c) a molten polyethylene terephthalate of intrinsic viscosity 0.15–0.3, the proportion of (c) being sufficient to effect a shortening of the time of reaction of said acid (a) and said carbonate (b) and being at least ½ the combined weight of (a) and (b), and the molar ratio of (b) to (a) being between 1:1 and 1.3:1, heating the resulting mixture until a molten reaction product of intrinsic viscosity 0.15 to 0.3 has been formed, withdrawing part of said molten reaction product, adding further free terephthalic acid in amount equivalent to the amount of said reaction product withdrawn and further cyclic ethylene glycol carbonate in a molar ratio to the further terephthalic acid added between 1:1 and 1.3:1, continuing to heat the mixture, repeating the withdrawal of molten reaction product and the addition of free terephthalic acid and cyclic ethylene glycol carbonate in the specified proportions, and further heating the low reaction product withdrawn until it is fibre-forming.

17. Process according to claim 16 wherein the reaction of the terephthalic acid, ethylene glycol carbonate and polyethylene terephthalate of intrinsic viscosity 0.15–0.3 is carried out as a continuous operation, and the further heating of the low reaction product so obtained to produce a fibre-forming material is carried out as a batch process.

18. Process according to claim 16 wherein the mixture of free terephthalic acid, cyclic ethylene glycol carbonate and molten polyethylene terephthalate of intrinsic viscosity 0.15–0.3 first formed contains an ester-interchange catalyst, and in the course of the process further ester-interchange catalyst is added to replace that withdrawn with the reaction product of intrinsic viscosity 0.15–0.3.

19. Process as set forth in claim 16 and in which the weight of (c) mixed with (a) and (b) is at most four times the combined weight of (a) and (b).

References Cited in the file of this patent

UNITED STATES PATENTS

| | | |
|---|---|---|
| 2,392,585 | Fryling | Jan. 8, 1946 |
| 2,465,319 | Winfield et al. | Mar. 22, 1949 |
| 2,520,959 | Powers | Sept. 5, 1950 |

FOREIGN PATENTS

| | | |
|---|---|---|
| 490,543 | Great Britain | Aug. 17, 1938 |
| 870,484 | France | Dec. 12, 1941 |